Jan. 17, 1961
R. D. MOHLER
2,968,739
TRANSISTOR POWER SUPPLY
Filed Aug. 1, 1958
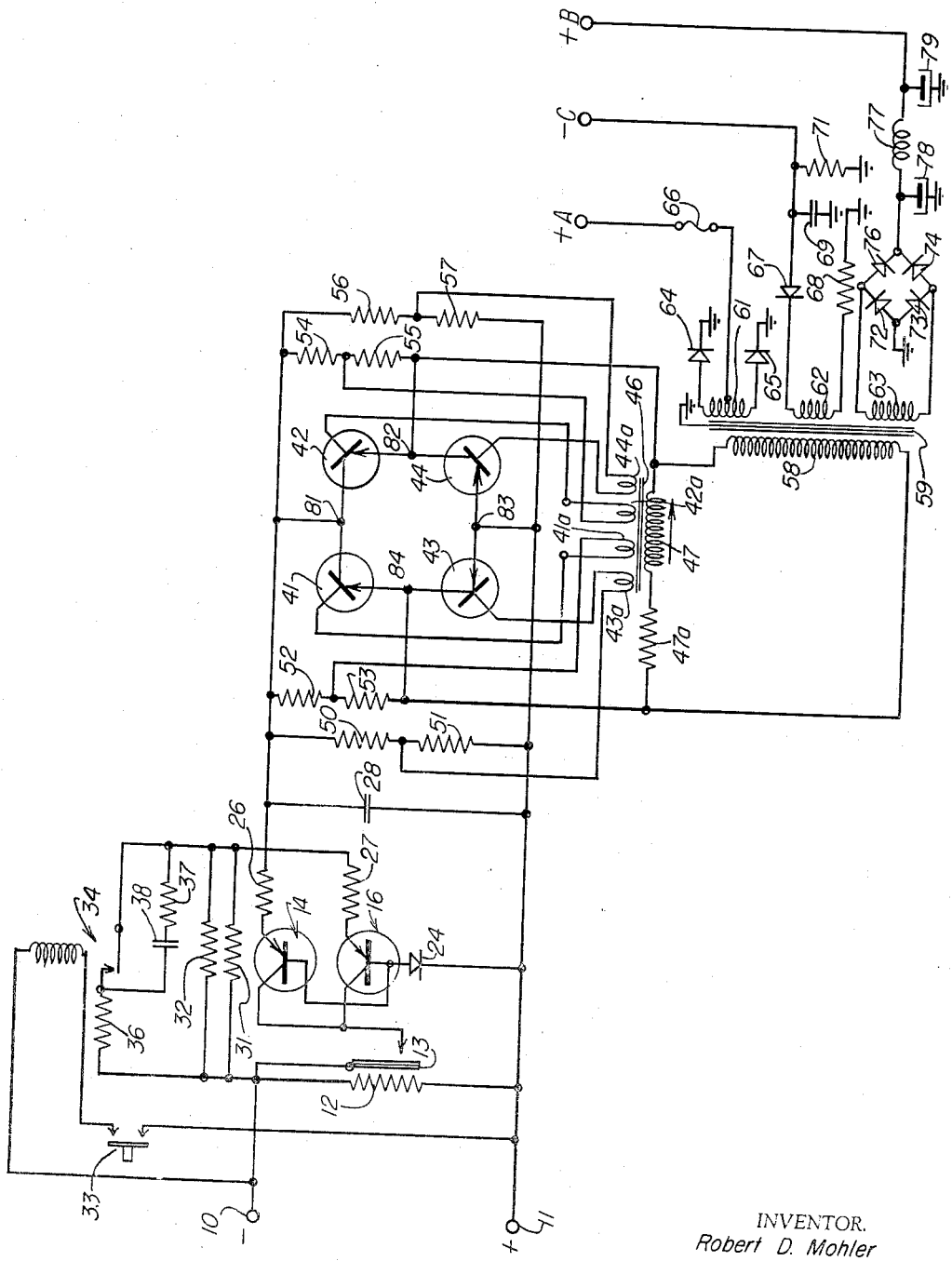
INVENTOR.
Robert D. Mohler
BY Mueller & Aichele
Attys.

United States Patent Office 2,968,739
Patented Jan. 17, 1961

2,968,739

TRANSISTOR POWER SUPPLY

Robert D. Mohler, Glen Ellyn, Ill., assignor to Motorola, Inc., Chicago, Ill., a corporation of Illinois Filed Aug. 1, 1958, Ser. No. 752,514

11 Claims. (Cl. 307—150)

This invention relates to electrical power supplies, and more particularly to power supplies for converting direct current from an unregulated source to voltages required in the operation of mobile communication equipment.

In the past, two-way radio equipment has been used in a variety of vehicles such as in railway equipment including diesel locomotives. The power for operating the radio equipment is derived from a generator operated by the diesel engine, the direct current available being converted to an alternating current which is transformed to the voltages desired and rectified to provide direct current at the various potentials necessary to operate the equipment. Conversion of the primary direct current to alternating current involves the production of a pulsating direct current. This is frequently accomplished by either a vibrator or a rotary converter. Both of these devices are essentially mechanical switches which are cycled at a rapid rate such as 60 times per second and thus subject to considerable wear. Because of this wear, the vibrator or rotary converter has a short lifetime and frequent repair and replacement is necessary.

In order to alleviate the maintenance problem created by the short lifetime of mechanical switching systems, it is desirable to substitute electronic means for converting the variable primary direct current to a pulsating current having a regulated voltage. In diesel engines, however, the primary voltage supply may vary between 64 and 85 volts D.C. and this variation in voltage is outside of the tolerances for most tubes so that electronic systems employing vacuum tubes as control elements have required frequent repair and replacement.

In many electronic applications transistors have been used to replace vacuum tubes because of their greater reliability, ruggedness of structure, and compactness. However, transistors operate at low voltage and it has heretofore been impractical to employ transistors in oscillator circuits handling voltages of the magnitudes supplied by diesel motor generators. This is due to the fact that the applied voltage in most oscillator circuits is multiplied across the electronic switching elements and such multiplied voltages are considerably higher than the maximum that can be handled by transistors.

It is an object of the present invention to provide a reliable and durable power supply particularly adapted to convert an unregulated D.C. voltage to a plurality of direct currents of different voltages.

It is another object of the invention to provide a fully electronic system for converting direct current supplied by a railway generator to a plurality of direct currents of different voltages adapted to operate two-way radio equipment.

It is a further object of the invention to provide a fully transistorized power supply particularly adapted for use in connection with two-way radio systems in railway locomotives and which can be operated without danger of overloading the transistor.

A feature of the invention is the provision of a power supply system wherein fluctuating direct current input voltage is regulated within a relatively narrow range before it is converted to alternating current and transformed to a plurality of direct current output voltages. A provision of a single volage regulator prior to transformation of the primary voltage source considerably simplifies the system with respect to those employing voltage regulators for each of a plurality of direct current outputs.

Another feature is the provision in a power supply system including one or more transistor oscillator bridges which operate by the alternate biasing of transistors to conducting and cut-off conditions and arranged so that the maximum voltage appearing across a cut-off transistor is the applied voltage rather than any multiple thereof. This is done by connecting four transistors in a bridge so that one pair of parallel connected transistors is connected to one polarity of the source and a second pair is connected to the opposite polarity.

The accompanying drawing is a schematic circuit diagram of a power supply system embodying the present invention.

In accordance with the present invention, a fluctuating direct current voltage such as that supplied from the generator on a locomotive is first regulated to within relatively narrow limits by a transistor series voltage regulator. The regulated output is then applied across a transistor oscillator bridge in which the transistors perform a switching function to convert the regulated input voltage to a pulsating square wave output. The particular arrangement of the transistors in the bridge circuit prevents them from being overloaded since the maximum voltage across any transistor in its cutoff state is the output of the voltage regulator and not a multiple thereof. The pulsating current is fed to the primary coil of a power transformer and converted to alternating current of different voltages which are rectified to serve as suitable supply voltages for a mobile two-way radio system. Since the power supply is all electronic in its operation, it has a longer life and higher reliability than conventional power supplies employing mechanical current interrupting means. The use of transistors instead of vacuum tubes in the system permits it to be compact in size and also improves its general reliability and service life.

In the circuit illustrated, an unregulated direct current potential is applied between the terminals 10 and 11 from a power source such as a Diesel engine generator and in the embodiment described this potential varies between about 64 and 85 volts. A time delay circuit composed of resistor 12 and thermal switch 13 is provided across the input voltage with the switch connected to the voltage regulating transistors 14 and 16. In the embodiment shown these transistors are PNP transistors connected in parallel. The base electrodes of the transistors are connected to Zener diode 24 as shown. Resistors 26 and 27 are provided to equalize current through the regulating transistors which cooperate with the Zener diode to provide a regulated output voltage. A capacitor 28 is connected across the output of the regulator portion of the circuit.

In order to prevent overloading of transistors 14 and 16 a portion of the input current is bypassed through parallel resistors 31 and 32. When the radio equipment is drawing a higher power during transmission, closing of the transmitting switch 33 closes the relay indicated at 34 and connects additional resistor 36 to provide for bypassing the added current load. Capacitor 38 and resistor 37 provide surge elimination in switching the equipment from the receiving to the transmitting condition.

The oscillator stage of the system is composed of four PNP alloy junction power transistors 41, 42, 43 and 44, connected as shown to form a bridge. Each of the transistors has its base connected to a secondary winding 41a through 44a respectively which form part of a feedback transformer made up of saturable core 46 and primary winding 47. Resistor 47a is connected to the primary winding to limit primary current and thereby limit saturation of the core. Resistors indicated by the reference characters 50 through 57 provide for the application of bias voltages to initiate oscillations in the bridge circuit and to limit base current in the transistor as will be explained subsequently.

The transistor bridge includes first, second, third and fourth connection points 81, 82, 83 and 84 respectively. The output of the voltage regulator is connected across the first and third point 81 and 83. One end of primary winding 47 of the feedback transformer is connected to second point 82 while the other end is connected to fourth point 84 through the serially connected resistor 47a. The primary winding 47 of the feedback transformer is in parallel with the primary 58 of a power transformer which includes core 59 and appropriate secondary windings 61, 62 and 63. Core 46 of the feedback transformer is chosen so that it will saturate before core 59.

The power transformer changes the pulsating square wave output from the transistor bridge into various alternating voltages. The secondary winding 61 provides the input for a low voltage direct current output to provide filament current and is made up of the rectifiers 64 and 65 and fuse 66 providing a 12 volt D.C. output. Winding 62 provides the input for a half wave rectifier circuit made up of the rectifier 67 and its associated filter network including resistor 68, capacitors 69 and resistor 71. This provides a suitable negative biasing voltage. Positive operating voltage is supplied from the winding 63 connected to the bridge circuit made up of rectifiers 72, 73, 74 and 76 and a filter section including the coil 77 and the capacitors 78 and 79. Further output windings may be provided as required in a particular equipment.

In operation of the system, a primary direct current voltage from a source such as a diesel engine generator is applied across the terminals 10 and 11. This voltage is unregulated between the range of about 64 to 85 volts and is to be regulated to 58 volts plus or minus 3 volts by the series voltage regulator system. The thermal switch 13 will not close until the resistor 12 is heated by input current. This protects the system against damage from high surges of current through the transistors 14 and 16 when the equipment is first turned on. Zener diode 24 provides a reference voltage of 58 volts so that a current inversely proportional to a deviation between this standard and the output voltage is applied as base current to the transistors 14 and 16 connected in parallel. Variations in the base currents of these transistors produce variations in their collector currents in a sense and direction effective to substantially neutralize these changes so that a relatively constant output voltage is obtained. Since it is necessary that all of the individual output voltages of the system be regulated, the provision of the voltage regulator before the oscillator and transformer stages permits but a single regulator circuit to be used and eliminates the necessity of providing separate regulator systems for each ultimate voltage.

It is necessary to convert the direct current output of the regulator into an alternating square wave signal so that it can be ultimately transformed to different voltages. This conversion is accomplished by the transistor oscillator bridge made up of transistors 41, 42, 43 and 44. As shown, the base of each transistor is connected to an end of a secondary winding of the feedback transformer having primary winding 47. Transistors 41 and 44 each have their bases connected to ends of their corresponding windings 41a and 44a which are of a given polarity while transistors 42 and 43 have their bases connected to the ends of their corresponding windings 42a and 43a which are of the opposite polarity. The base of each transistor is also connected to a biasing resistor of relatively high ohmic value to provide a starting bias. Thus, resistor 50 biases transistor 43, resistor 52 biases transistor 41, resistor 54 biases transistor 42 and resistor 56 biases transistor 44. Each transistor is further connected to a base current limiting resistor of lower ohmic value so that the amount of base current in each transistor is more or less independent of the internal characteristics of the unit. Thus, resistor 51 controls transistor 43, resistor 53 controls transistor 41, resistor 55 controls transistor 42 and resistor 57 controls transistor 44.

As direct current is applied to the transistor bridge, one of the transistors will begin to conduct due to inevitable slight dissimilarities in the electrical properties in the transistors and the circuit will begin to oscillate. Assume that the initial surge of current through the transistors and primary winding 47 is in the direction indicated by the arrow. A voltage will appear across the secondary windings 41a through 44a. The base electrodes of transistors 42 and 43 are connected to what will be the negative side of their respective windings and so are biased further into conduction while the base electrode of transistors 41 and 44 are biased to their cutoff or nonconducting state. When the core 46 of the transformer becomes saturated, the induced voltages in the secondary windings decrease to zero with the base currents also decreasing to zero. This causes the voltage across the transistors 42 and 43 to rise thus dropping the voltage across the transformer primary 47. This reverses the direction of flux through the transformer core 46. This reversal of flux induces currents of reverse polarities in the secondary windings so that transistors 41 and 44 are conducting and transistors 42 and 43 are cut off. The switching of each pair of transistors into conduction is very rapid and causes the voltage induced in the power supply transformer to appear as a square wave in the primary winding 58. In the particular embodiment described, the switching action takes place at the rate of 800 cycles per second.

It will be apparent from the accompanying schematic drawing that at no time does the voltage appearing across the cutoff transistors in the oscillation bridge exceed more than the output voltage of the regulator. This system thus has a particular advantage as applied to transistors because if a conventional center tapped full wave rectifier were employed using transistors as oscillatory elements, a voltage equal to double that of the applied voltage would appear across the cutoff units. Where the applied voltage is as high as that in the present system being derived from a locomotive generator, it would normally be impractical to employ transistors in the oscillator bridge since a conventional alloy junction transistor would break down under double the applied voltage which might exceed 120 volts. This same system can be applied to higher voltages by placing more transistor bridges in series.

The invention thus provides an all-electronic power supply particularly useful in two-way communication equipment for railway use and which is of much greater reliability and longer life expectancy than prior art devices employing mechanical vibrators. Because of the novel bridge oscillator circuit, transistors can be used to switch higher voltages than has previously been practical and the incorporation of transistors instead of vacuum tubes further improves reliability and reduces maintenance costs.

I claim:

1. A power supply for converting an unregulated direct current potential to a plurality of regulated direct current potential sources including in combination, a voltage regulator for connection to the unregulated source of direct current potential and including transistor means adapted to provide a voltage regulated direct current output, a bridge coupled transistor oscillator connected to the output of said voltage regulator, said oscillator including alternately conductive pairs of transistors adapted to provide a pulsating direct current output, a power transformer having a primary winding connected to the output of said oscillator and further having a plurality of secondary windings, and rectifying means connected to each of said secondary windings.

2. A power supply for converting a primary direct current varying between about 64 and about 85 volts to a plurality of regulated direct current potential sources adapted to the operation of two-way radio equipment including in combination, a voltage regulator for connection to the source of direct current potential which varies within the range specified, said regulator adapted to provide a regulated direct current output of about 58 volts, a transistor bridge oscillator including four alloy junction transistors and a feedback transformer, means connecting the output of said voltage regulator connected to said bridge so that any transistor in cutoff condition during oscillation of said bridge has a voltage impressed upon it no greater than the output of said regulator, said oscillator providing a pulsating direct current output, a power transformer having its primary winding connected to the output of said oscillator and having a plurality of secondary windings and rectifying means connected to each of said secondary windings.

3. A power supply according to claim 2 wherein said voltage regulator includes a Zener diode as a reference voltage source and an alloy junction transistor serially connected to said primary direct current.

4. A transistor oscillator including in combination, a bridge circuit having first, second, third and fourth connection points, first, second, third and fourth transistors each having base emitter and collector electrodes, said transistors having the emitter and collector electrodes thereof connected between said points in sequence, a feedback transformer having a primary winding and first, second, third and fourth secondary windings, each of said transistors having its base electrode connected to a corresponding secondary winding, said base electrodes of said first and third transistors connected to the ends of their windings corresponding to a given polarity for a voltage in said primary winding in a given direction, said base electrodes of said second and fourth transistors connected to the ends of their windings corresponding to the opposite polarity, a source of direct current connected between said first and third points and output connections for said oscillator at said second and fourth points, voltages induced in said secondary windings of said feedback transformer biasing said first and third transistors to conduction while biasing said second and fourth transistors to cutoff and alternately biasing said first and third transistors to cutoff while biasing said second and fourth transistors to conduction to provide a pulsating direct current output for said oscillator.

5. A transistor oscillator including in combination, a bridge circuit having first, second, third and fourth connection points, a first transistor between said first and second points, a second transistor between said second and third points, a third transistor between said third and fourth points and a fourth transistor between said fourth and first points, a feedback transformer having a primary winding connected across said second and fourth points and further having first, second, third and fourth secondary windings, each of said transistors having its base electrode connected to a corresponding secondary winding, said base electrodes of said first and third transistors connected to the ends of their windings corresponding to a given polarity for a voltage in said primary winding in a given direction, said base electrodes of said second and fourth transistors connected to the ends of their windings corresponding to the opposite polarity, a source of direct current connected between said first and third points, a power transformer including a primary winding connected across said second and fourth points, said bridge adapted to oscillate to provide a square wave output with said first and third transistors biased to conduction only during one half of the oscillating cycle and said second and fourth transistors biased to conduction only during the other half of said oscillating cycle.

6. A transistor oscillator including in combination, a bridge circuit having first, second, third and fourth points, a first transistor between said first and second points, a second transistor between said second and third points, a third transistor between said third and fourth points, and a fourth transistor between said fourth and first points, a feedback transformer having a saturable core, a primary winding and first, second, third, and fourth secondary winding, each of said transistors having its base electrode connected to a corresponding secondary winding, said base electrodes of said first and third transistors connected to the ends of their windings corresponding to a given polarity from a voltage in said primary winding in a given direction, said base electrodes of said second and fourth transistors connected to the ends of their windings corresponding to the opposite polarity, a source of direct current connected between said first and third points, the polarity of the ends of said secondary windings reversing upon saturation of the core of said feedback transformer and providing for oscillation of said bridge, and a power transformer having a core of higher saturation value than the core of said feedback transformer and having its primary winding connected across said second and fourth points of said bridge.

7. A bridge connected transistor circuit including in combination, first through fourth transistors having respective input electrodes and output electrodes, an input transformer having a primary winding and first through fourth windings inductively coupled to said primary winding, means for applying signals to said primary winding, means coupling said input electrodes of said transistors respectively to said first through fourth windings with said windings having one polarity for said first and third transistors and opposite polarity for said second and fourth transistors, an output load circuit, power supply leads for energizing said circuit, means coupling said output electrodes of said first and third transistors in series with said power supply leads and said output load circuit to conduct signal current in one direction through said load circuit, and means coupling said output electrodes of said second and fourth transistors in series with said power supply leads and said output load circuit to conduct signal current in the opposite direction through said load circuit, whereby said first and third transistors and said second and fourth transistors conduct in series relation in response to signals in said primary winding.

8. A bridge connected transistor circuit including in combination first through fourth transistors having respective base, emitter and collector electrodes, an input transformer having a primary winding and first through fourth windings inductively coupled to said primary winding, means for applying signals to said primary winding, means coupling said first through fourth windings respectively between said base and emitter electrodes of said first through fourth transistors and including a resistor series coupled with each of such windings and the associated emitter electrode, said first and third windings being poled oppositely to said second and fourth windings with respect to said primary winding, power supply leads for energizing said circuit, an output load circuit, means coupling said collector electrode of said first and second transistors to one power supply lead and means coupling said emitter electrode of said third and fourth transistors to another power supply lead, and means coupling said load circuit between said emitter electrodes of said first and second transistors and between said collector electrodes of said third and fourth transistors, whereby said first and third transistors and said second and fourth transistors conduct in opposite directions through said load circuit in response to signals in said primary winding.

9. A bridge connected transistor oscillator circuit including in combination first through fourth transistors having respective base, emitter and collector electrodes, transformer means having first through fourth feedback windings and further winding means inductively coupled to said feedback windings, power supply leads for energizing said oscillator circuit, means intercoupling said collector and emitter electrodes of said first and fourth transistors and means intercoupling said collector and emitter electrodes of said second and third transistors, means intercoupling said collector electrodes of said first and second transistors to one power supply lead, means intercoupling said emitter electrodes of said third and fourth transistors to another power supply lead, means coupling said further winding means between said collector and emitter electrodes of said first and fourth transistors and said collector and emitter electrodes of said second and third transistors to form a bridge circuit for deriving signals upon conduction of alternate pairs of said transistors, and means coupling said first through fourth feedback windings respectively between said base and emitter electrodes of said first through fourth transistors, said first and third feedback windings being poled oppositely to said second and fourth feedback windings for controlling said transistors so that said first and third transistors are switched to be series conductive through said further winding means in one direction and said second and fourth transistors are switched to be series conductive through said further winding means in the other direction.

10. A bridge connected transistor oscillator circuit including in combination, first through fourth transistors having respective base, emitter and collector electrodes, transformer means having first through fourth feedback windings and further winding means inductively coupled to said feedback windings, power supply leads for energizing said oscillator circuit, means intercoupling said collector and emitter electrode of said first and fourth transistors and means intercoupling said collector and emitter electrodes of said second and third transistors, means intercoupling said collector electrodes of said first and second transistors to one power supply lead, means intercoupling said emitter electrodes of said third and fourth transistors to another power supply lead, means coupling said further winding means between said collector and emitter electrodes of said first and fourth transistors and said collector and emitter electrodes of said second and third transistors to form a bridge circuit for deriving signals upon conduction of alternate pairs of said transistors, means coupled to said further winding means for deriving output signals, first through fourth voltage dividers coupled between one of said power supply leads and respective emitter electrodes of said first through fourth transistors, and means coupling said first through fourth feedback windings respectively between said base electrodes of said first through fourth transistors and intermediate points of said first through fourth voltage dividers, said first and third feedback windings being poled oppositely to said second and fourth feedback windings for controlling oscillatory feedback to said transistors so that said first and third transistors are series conductive through said further winding means in one direction and said second and fourth transistors are series conductive through said further winding means in the other direction.

11. A power supply for converting a direct current potential into a regulated alternating current potential including in combination, a voltage regulator circuit adapted to be connected to the source of direct current potential, said voltage regulator circuit including transistor means series coupled with the direct current potential and a control network for regulating conduction of said transistor means in response to voltage variation of the direct current potential, a bridge coupled transistor oscillator connected to said voltage regulator and including an intercoupled feedback transformer and four transistors serially conductive in pairs, with different pairs of said transistors alternatively conductive, and means for deriving an alternating current output signal from said transistor oscillator.

References Cited in the file of this patent

UNITED STATES PATENTS

| | | |
|---|---|---|
| 2,155,363 | Parker | Apr. 12, 1939 |
| 2,175,694 | Jones | Oct. 10, 1939 |
| 2,475,063 | Thalner | July 5, 1949 |
| 2,583,837 | Hadfield | June 29, 1952 |
| 2,714,702 | Shockley | Aug. 2, 1955 |